(12) United States Patent
Frey et al.

(10) Patent No.: US 7,475,401 B1
(45) Date of Patent: Jan. 6, 2009

(54) FILTERED UNIFIED LOGGING SERVICE

(75) Inventors: Gregor K. Frey, Lorsch (DE); Heiko D. Kiessling, Eppelheim (DE); Miroslav R. Petrov, Sofia (BG); Georgi G. Manev, Sofia (BG); Nikola I. Marchev, Sofia (BG)

(73) Assignee: SAP AG, Walldorf (DE)

( * ) Notice: Subject to any disclaimer, the term of this patent is extended or adjusted under 35 U.S.C. 154(b) by 810 days.

(21) Appl. No.: 10/748,012

(22) Filed: Dec. 30, 2003

(51) Int. Cl.
*G06F 13/00* (2006.01)

(52) U.S. Cl. ....................................................... 719/313

(58) Field of Classification Search ................. 719/313, 719/328; 717/127, 128; 707/7
See application file for complete search history.

(56) References Cited

U.S. PATENT DOCUMENTS

| | | | |
|---|---|---|---|
| 5,201,044 A | 4/1993 | Frey et al. | |
| 6,061,721 A | 5/2000 | Ismael et al. | |
| 6,083,281 A | 7/2000 | Diec et al. | |
| 6,134,581 A | 10/2000 | Ismael et al. | |
| 6,144,967 A | 11/2000 | Nock | |
| 6,308,208 B1 | 10/2001 | Jung et al. | |
| 6,356,931 B2 | 3/2002 | Ismael et al. | |
| 6,470,388 B1 | 10/2002 | Niemi et al. | |
| 6,539,501 B1 * | 3/2003 | Edwards ..................... 714/45 |
| 6,553,403 B1 | 4/2003 | Jarriel et al. | |
| 6,567,809 B2 | 5/2003 | Santosuosso | |
| 6,681,232 B1 | 1/2004 | Sistanizadeh et al. | |
| 6,738,933 B2 | 5/2004 | Fraenkel et al. | |
| 6,772,178 B2 | 8/2004 | Mandal et al. | |
| 6,789,257 B1 | 9/2004 | MacPhail | |
| 6,802,067 B1 * | 10/2004 | Camp et al. .................. 719/315 |
| 6,834,301 B1 | 12/2004 | Hanchett | |
| 6,851,118 B1 | 2/2005 | Ismael et al. | |
| 6,862,711 B1 | 3/2005 | Bahrs et al. | |
| 6,880,125 B2 | 4/2005 | Fry | |

(Continued)

FOREIGN PATENT DOCUMENTS

JP  2001195151  7/2001

(Continued)

OTHER PUBLICATIONS

"The Source for Developers; Core Java Java Management Extensions (JMX)", *Sun Microsystems, Inc., "The Source for Developers: Core Java Java Management Extensions (JMX)"* 2 pages, (Apr. 2, 2004), 2 pages.

(Continued)

*Primary Examiner*—Andy Ho
(74) *Attorney, Agent, or Firm*—Blakley, Sokoloff, Taylor & Zafman LLP

(57) ABSTRACT

Apparatus, methods, and systems for provision of filtered unified logging interfaces or services, for example, employed within application servers. In one embodiment of the invention, a filtered unified logging application programming interface (API) provides unified configuration and/or viewing for both tracing and logging. Use of filters provides a finer granularity of log controller or log output, for example, when compared with only utilizing severity. A method of providing filtered unified logging includes receiving a message, the message having a predefined severity; dropping the message if the message severity does not reach a threshold severity; applying one or more filters to the message if the message severity reaches the threshold severity; and sending the message to a destination if the message is not filtered out.

20 Claims, 6 Drawing Sheets

U.S. PATENT DOCUMENTS

| | | | |
|---|---|---|---|
| 6,925,631 B2 | 8/2005 | Golden | |
| 6,985,848 B2 | 1/2006 | Swoboda et al. | |
| 6,990,601 B1 | 1/2006 | Tsuneya et al. | |
| 7,000,235 B2 | 2/2006 | Mandal et al. | |
| 7,017,051 B2 | 3/2006 | Patrick | |
| 7,017,162 B2 | 3/2006 | Smith et al. | |
| 7,024,474 B2 * | 4/2006 | Clubb et al. | 709/223 |
| 7,051,324 B2 | 5/2006 | Gissel et al. | |
| 7,058,558 B2 | 6/2006 | Reichenthal | |
| 7,062,540 B2 | 6/2006 | Reddy et al. | |
| 7,069,267 B2 | 6/2006 | Spencer, Jr. | |
| 7,086,065 B1 | 8/2006 | Yeluripati et al. | |
| 7,120,685 B2 | 10/2006 | Ullmann et al. | |
| 7,152,104 B2 | 12/2006 | Musante et al. | |
| 7,174,370 B1 * | 2/2007 | Saini et al. | 709/220 |
| 7,200,588 B1 * | 4/2007 | Srivastava et al. | 707/3 |
| 7,206,827 B2 | 4/2007 | Viswanath et al. | |
| 7,240,334 B1 | 7/2007 | Fluke et al. | |
| 7,251,809 B2 | 7/2007 | Barclay et al. | |
| 7,305,671 B2 | 12/2007 | Davidov et al. | |
| 2002/0029298 A1 | 3/2002 | Wilson | |
| 2003/0005173 A1 | 1/2003 | Shah et al. | |
| 2003/0110252 A1 | 6/2003 | Yang-Huffman | |
| 2003/0120593 A1 | 6/2003 | Bansal et al. | |
| 2003/0167304 A1 | 9/2003 | Zhu et al. | |
| 2003/0225872 A1 | 12/2003 | Bartek et al. | |
| 2004/0022237 A1 | 2/2004 | Elliott et al. | |
| 2004/0028059 A1 | 2/2004 | Josyula et al. | |
| 2004/0148610 A1 | 7/2004 | Tsun et al. | |
| 2004/0158837 A1 | 8/2004 | Sengodan | |
| 2004/0230973 A1 | 11/2004 | Cundiff, Jr. et al. | |
| 2004/0249613 A1 | 12/2004 | Sprogis et al. | |
| 2004/0268314 A1 * | 12/2004 | Kollman et al. | 717/128 |
| 2005/0010608 A1 | 1/2005 | Horikawa | |
| 2005/0028171 A1 | 2/2005 | Panagiotis et al. | |
| 2005/0033777 A1 | 2/2005 | Moraes et al. | |
| 2005/0038889 A1 | 2/2005 | Frietsch | |
| 2005/0097110 A1 * | 5/2005 | Nishanov et al. | 707/100 |
| 2005/0102536 A1 | 5/2005 | Patrick et al. | |
| 2005/0132337 A1 * | 6/2005 | Wedel et al. | 717/128 |

FOREIGN PATENT DOCUMENTS

| | | |
|---|---|---|
| JP | 2002073522 | 3/2002 |
| JP | 2002082777 | 3/2002 |
| WO | IB-WO 0205102 A1 | 1/2002 |
| WO | IB-WO 0241154 A2 | 5/2002 |

OTHER PUBLICATIONS

Hampton, Kip, "High-Performance XML Parsing with SAX", *Published on XML.com* by Feb. 14, 2001.

McLaughlin, Brett. "Tip: Set up a SAX Parser", *Published by International Business Machines Corporation on Jul. 2, 2003*.

""EarlyAdopter_DS.pdf, Bibliographic Data for Early Adopter: J2SE 1.4"", *by Wrox Press* 1 pg, (Sep. 2001).

"Java Logging Overview", (Nov. 2001), pp. 1-9.

Hart, James, ""Early Adopter; J2SE 1.4"", chapter 5, *Wrox Press*, (Sep. 2001), pp. 1-12.

\* cited by examiner

200 COMPUTER SYSTEM

FILTERED UNIFIED LOGGING SERVICE

BACKGROUND OF THE INVENTION

1. Field of the Invention

Embodiments of this invention generally relate to a unified logging and tracing facility. More particularly, an embodiment of the invention relates to a unified logging and tracing service employed in an application server.

2. Description of Related Art

Java 2 Enterprise Edition (J2EE) is a tool commonly used in software development today. Generally, J2EE reduces the costs and complexity associated with developing multi-tier enterprise services. Another advantage of J2EE is that it can be relatively rapidly deployed and enhanced as the need arises. J2EE is currently used in many large-scale application development projects for these reasons.

As application development projects grow larger, logging becomes increasingly more important. Logging can be a very useful debugging tool to isolate problems, for example, by tracking each stage of the application being evaluated.

FIG. 1 illustrates a logging mechanism 100 in accordance with the prior art. The mechanism 100 utilizes a logger module 102 to receive logging messages. The logger module 102 provides the logging messages to a handler 104, which directs the logging messages to a formatter 106. The handler 104 determines where the logging messages should be sent. The formatter 106 may then provide human-readable data to a user based on the destination determined by the handler 104.

A major issue with current logging solutions is the determination of how and when messages are logged. The problem is exasperated when a development project involves many modules or developers. This problem is further complicated when different interfaces and/or services are used across the development project modules.

SUMMARY OF INVENTION

Disclosed are novel and efficient apparatus, methods, and systems for filtered unified logging and tracing, for example, employed within application servers. In one embodiment of the invention, a filtered application programming interface (API) provides configuration and/or viewing for both tracing and logging. According to an embodiment of the invention, use of filters provides a finer granularity of log controller or log output, for example, when compared with only using severity.

In one embodiment of the invention, a method or providing filtered logging and tracing is disclosed. The method includes: receiving a message, the message having a predefined severity; dropping the message if the message severity does not reach a threshold severity; applying one or more filters to the message if the message severity reaches the threshold severity; and sending the message to a destination if the message is not filtered out.

In another embodiment of the invention, as long as the message passes a severity and filter evaluation of a child object, the message is published.

In a different embodiment of the invention, a filtered unified logging system is disclosed. The system includes: one or more log controllers to represent source data, each of the log controllers receiving one or more messages; one or more filters coupled to the log controllers to filter the received messages; one or more logs to represent one or more corresponding destinations for the received messages; and one or more filters coupled to the logs to filter the messages prior to publication by the logs.

In a further embodiment of the invention, the filtered unified logging system further includes a formatter coupled to each of the logs to determine a format of the received message prior to publication.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
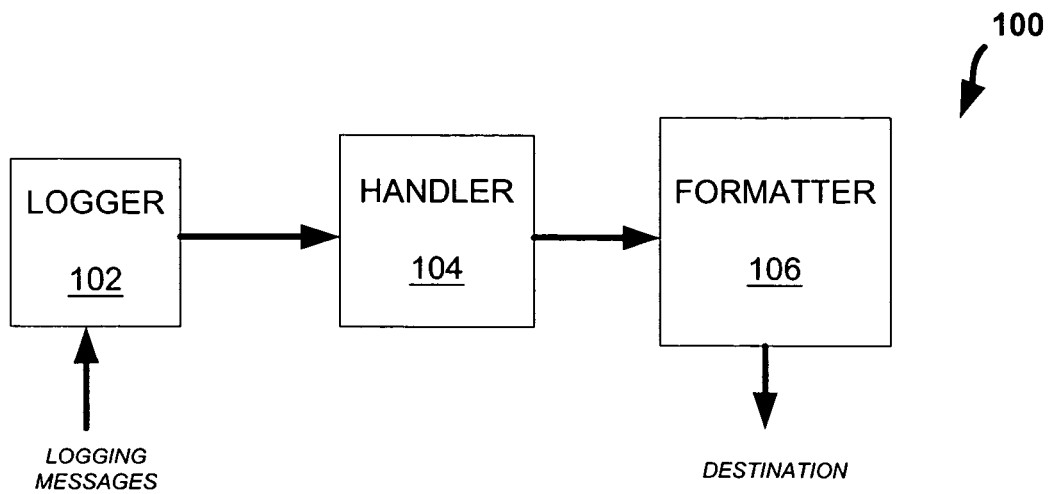
FIG. 1 illustrates a logging mechanism 100 in accordance with the prior art.
Figure 3:
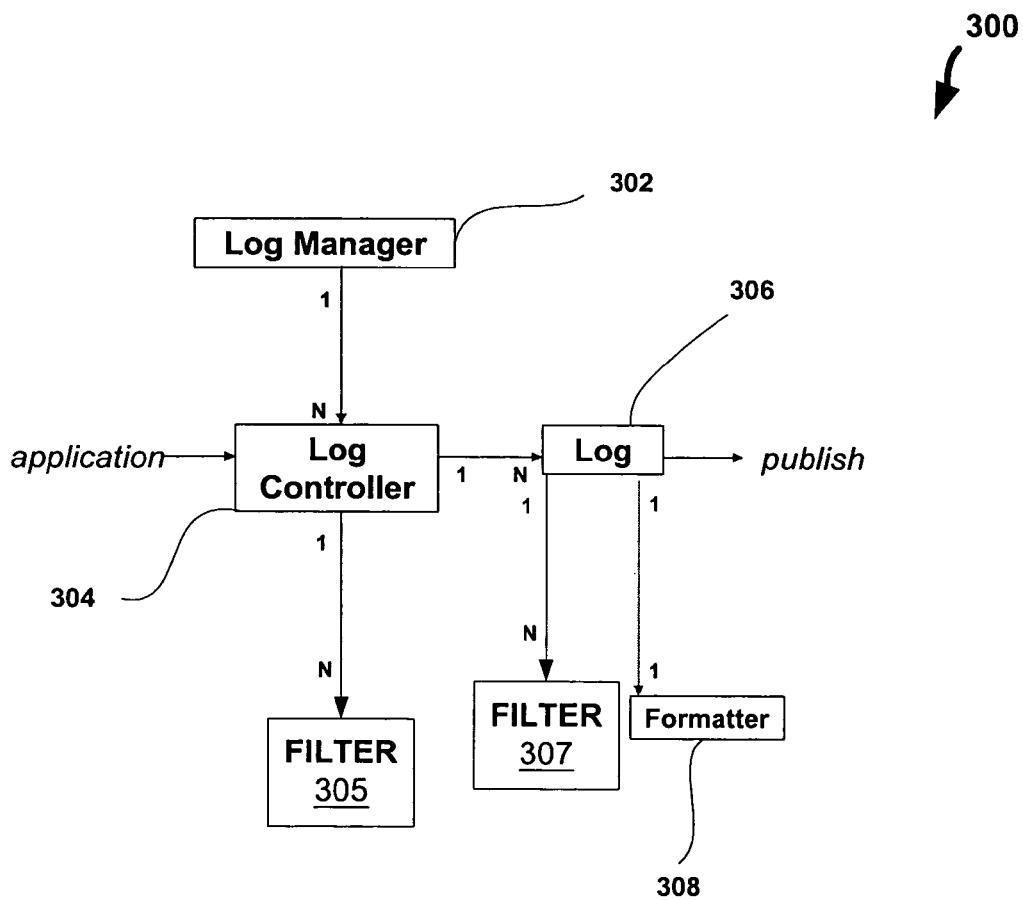
FIG. 3 illustrates an exemplary logging tool 300 in accordance with an embodiment of the invention.

FIG. 3 illustrates an exemplary tool 300 in accordance with an embodiment of the invention. The tool 300 includes a log manager 302 coupled to one or more log controllers 304 (one shown in FIG. 3, but the "N" markings in FIG. 3 indicate possible presence of N items). The log manager 302 manages the log controllers 304. In one embodiment of the invention, the log manager 302 is part of the kernel of the J2EE Engine and is started at system startup. The log manager configures the logging controllers for the kernel (e.g., by reading the configuration specified in the file log-configuration.xml). The log manager may also provide support for storing system critical logs in a database. Each log controller 304 may have access to one or more filters 305 to filter the messages received by the log controller 304. For example, the filters 305 may control whether the messages should be screened out or otherwise restricted.

In an embodiment of the invention, a log controller 304 may receive messages from an executing application. The log controller may be defined as a Java class having two subclasses or modules such as "category" to generate log messages and "location" to generate trace messages. Tracing involves the reconstruction of the control flow of an executing application, which may be used during program development and testing or problem detection, in productive systems (alternative or debugging). Tracing may be switched off during normal operation. Moreover, trace messages may be emitted to locations, which describe delimited code areas such as packages or classes.

Logging messages may be used to record normal or exceptional events that occur during program execution and this may be switched on during normal operation. The log messages may be emitted to categories, which describe distinguished problem areas such as database problems or security auditing. In an embodiment of the invention, log messages are also visible in a trace.

The source, for trace messages, may correspond to a hierarchical Java naming package or class such as:

com.sapmarkets.usermanagement.util.xxx
    com.sapmarkets.usermanagement.util.db.xxx The source, for log messages, may correspond to a logical name defined by a developer such as:

/System/Infrastructure/Dev/UM/DB/xxx
    /System/Infrastructure/Dev/UM/Network/xxx In an embodiment of the invention, logs typically are addressed to an administrator of a running system while traces typically are addressed to a developer and/or a support organization. Thus, the developer may decide whether a message is a log message or trace message.

The tool 300 further includes a log (or destination) 306 coupled to each of the log controllers 304. The log 306 may represent the destination to which the message received by the respective log controller should be sent (or otherwise published). Each log 306 may have access to one or more filters 307 to filter the messages prior to publication. For example, the filters 307 may control whether the messages should be screened out, otherwise restricted, or alter the output behavior. The log 306 is further coupled to a formatter 308, which determines the format of the message to be published.

In one embodiment of the invention, a message passed through the tool 300 may include a log record or portion thereof. The log record may be a structure that holds at best a portion of a message and data corresponding thereto. The log record may include severity information regarding the message, for example, to indicate the importance (severity) of the message. A severity threshold may be set and only a message with an assigned severity that is more severe than this threshold may be recorded and/or published.

In one embodiment of the invention, there are a number of severities, for example, six, provided as constants. Severity.DEBUG (e.g., for debugging purposes), Severity.PATH (e.g., to indicate a path severity, for example to keep track of a path), Severity.INFO (e.g., to indicate an informational severity), Severity.WARNING (e.g., to indicate a warning severity), Severity.ERROR (e.g., to indicate an error), and Severity.FATAL (e.g., to indicate a fatal error). To disable writing or logging, security or threshold of a Severity.NONE may be utilized.

Figure 4:
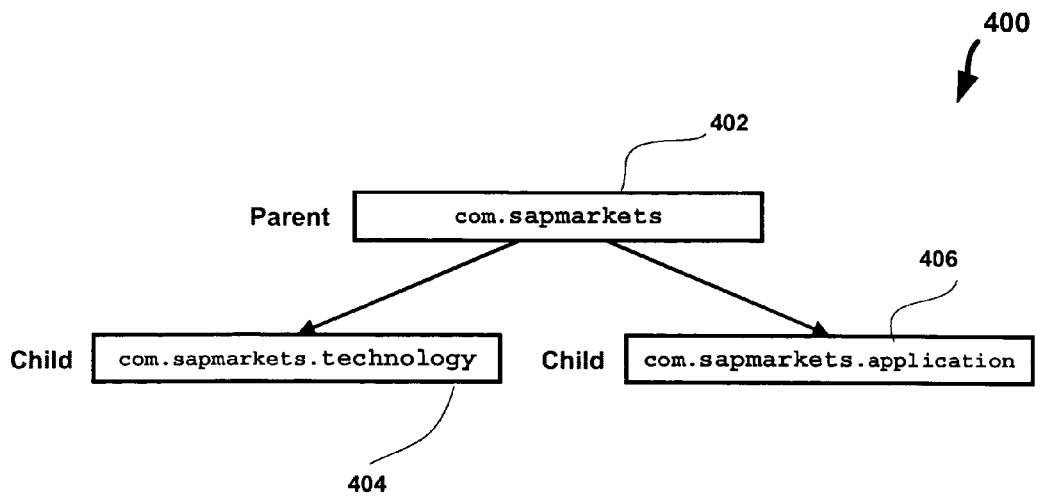
FIG. 4 illustrates an exemplary hierarchical configuration 400 for locations in accordance with an embodiment of the invention.
Figure 5:
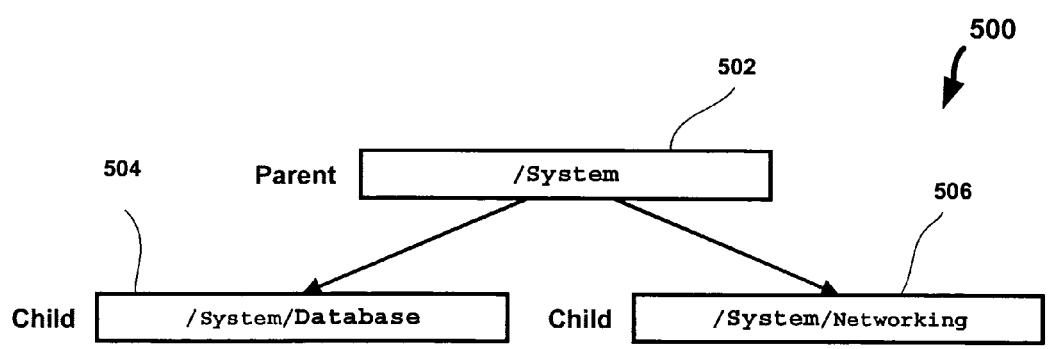
FIG. 5 illustrates an exemplary hierarchical configuration 500 for categories in accordance with an embodiment of the invention.

It is also envisioned that severities may be inherited, e.g., to reuse settings in hierarchies of code areas and message categories. For example, names of log controllers may be used to build implicit hierarchies. Locations may be named similar to qualified Java package and class names. For example with respect to the hierarchical configuration 400 of FIG. 4, a parent 402 passes on its severities to children 404 and 406. Additionally, FIG. 5 illustrates an exemplary hierarchical configuration 500 for categories where categories are named in a manner similar to naming conventions used in hierarchical file names. In the configuration of FIG. 5, the parent 502 passes on its severities to children 504 and 506.

Figure 6:
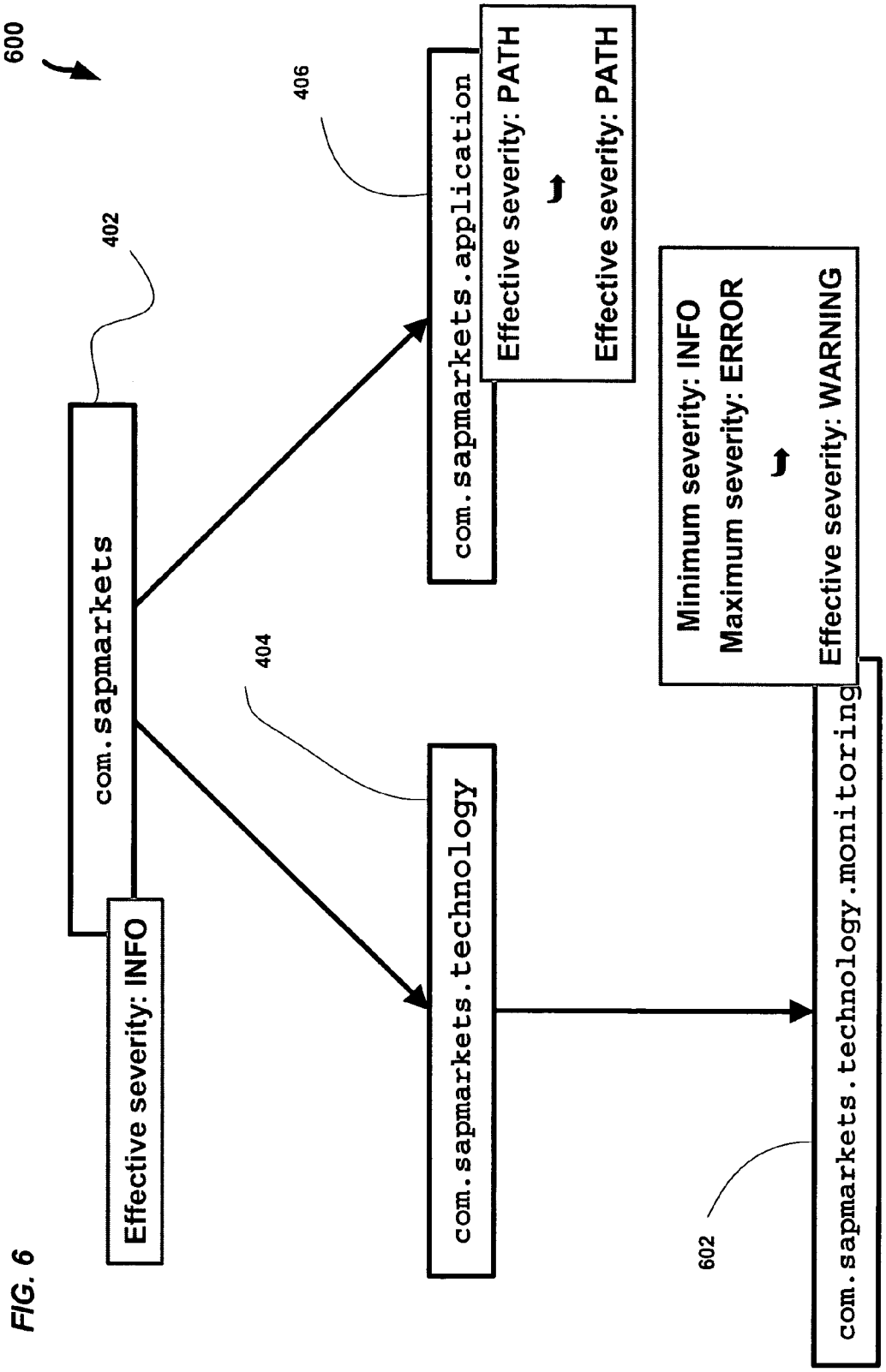
FIG. 6 illustrates an exemplary hierarchical configuration 600 with restricted inheritance in accordance with an embodiment of the invention.

FIG. 6 illustrates an exemplary hierarchical configuration 600 with restricted inheritance in accordance with an embodiment of the invention. The configuration 600 illustrates the restriction of the hierarchical configuration 400 of FIG. 4. The child 404 has its own child 602.

As illustrated in FIG. 6, configurations such as severity settings or logs may be passed on from parents to children unless overridden. In one embodiment of the invention, the following logs permit restriction of inheritance:

Private logs, specified with addPrivateLog, may be written according to the severity setting of the parent instead of the child; and Local logs, specified with addLocalLog, may be written when the parent itself is called.

Additionally, the inheritance of severity settings may be controllable via a range from a minimum to a maximum severity specified with:

<Controller>.setMinimumSeverity(<Value>); and
    <Controller>.setMaximumSeverity(<Value>).

Figure 7:
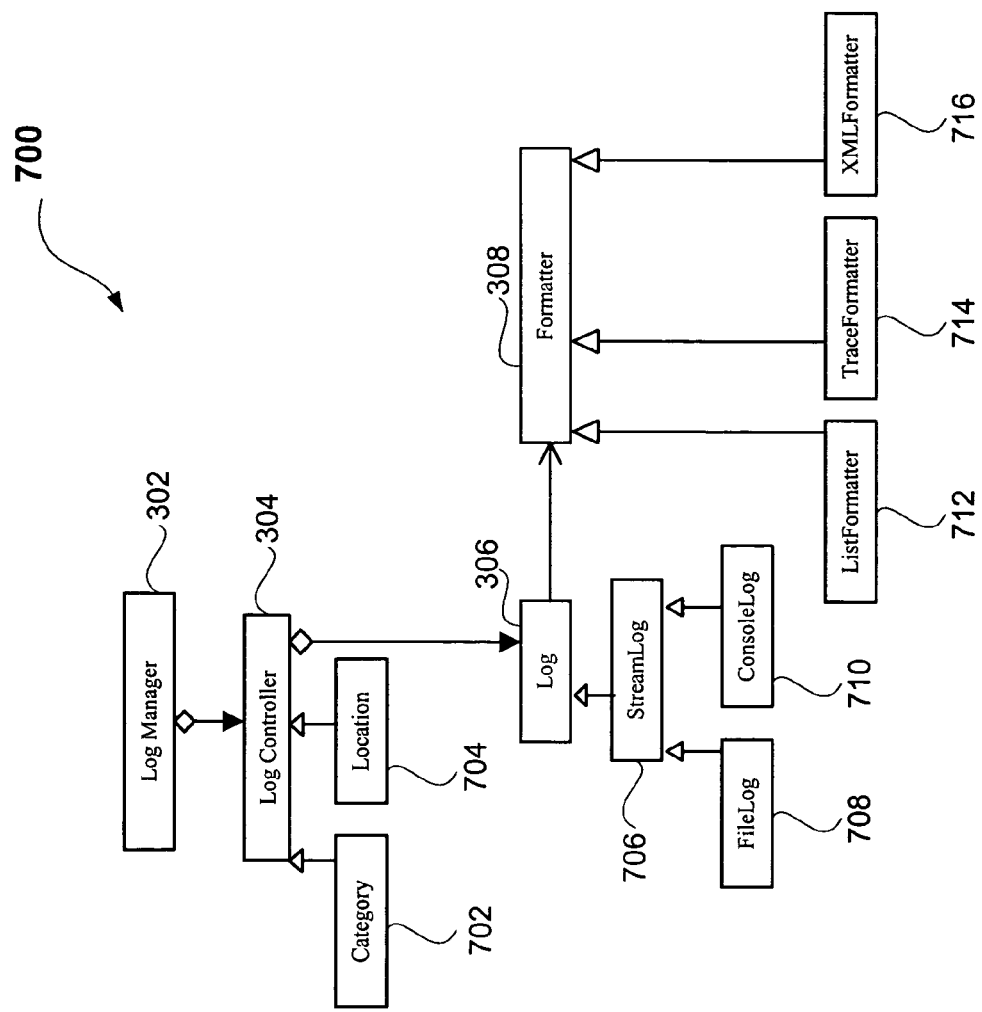
FIG. 7 illustrates an exemplary class diagram of a logging API 700 for the logging tool 300 of FIG. 3 in accordance with an embodiment of the invention.

FIG. 7 illustrates an exemplary class diagram of an API 700 for the tool 300 of FIG. 3 in accordance with an embodiment of the invention. The API 700 includes a log manager 302, a log controller 304, a log 306, and a formatter 308. The log controller 304 has two subclasses or modules, category 702 and location 704 (such as discussed with reference to FIG. 3). The log 306 has a subclass or module stream log 706 to enable writing to an arbitrary output stream. The stream log 706 may further have two subclasses or modules: file log 708 to write to a file or rotating file set and console log to write to a console or system error log (such as System.err).

In one embodiment of the invention, the formatter 308 has three subclasses or modules: (1) a trace formatter 714 to provide a human-readable, configurable format specifically for traces that are not read with a log viewer; (2) a list formatter 712 to provide a compact format of hash-separated message fields for processing in a log viewer; and (3) an extensible markup language (XML) formatter 716 to provide an XML-based format suitable for further processing in foreign applications.

in one embodiment of the invention, the log controller 304 and log 306 may have further access to filters (not shown), for example, to provide a finer granularity of log controller or log output, for example, when compared with only utilizing severity (such as discussed with reference to filters 305 and 307 of FIG. 3). In one embodiment of the invention, a "common" log is utilized to allow regular inheritance; hence, this log will become available to all descendants of the parent object. This may be an unconditional inheritance. As long as the message passes the severity and filter evaluation of the child object, it may be printed out via the inherited log.

Figure 8:
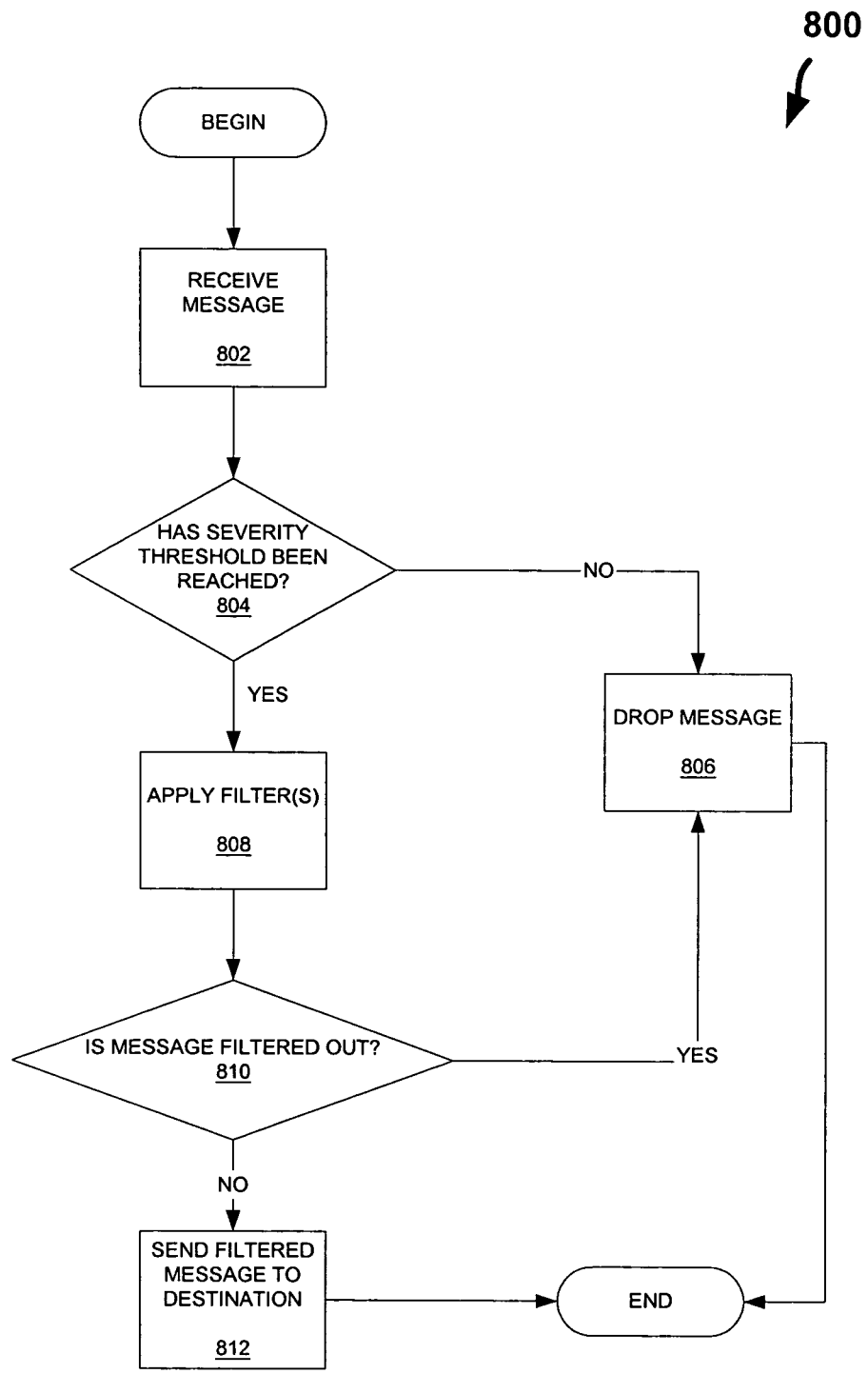
FIG. 8 illustrates an exemplary logging method 800 in accordance with an embodiment of the invention.

FIG. 8 illustrates an exemplary logging method 800 in accordance with an embodiment of the invention. The logging method 800 starts in a stage 802 by receiving a message (e.g., containing trace or log information) from a source such as an application. The message may include predetermined severity information (such as discussed with reference to FIGS. 3-7). In a stage 804, it is determined whether a severity threshold has been reached. If it is determined that the threshold has not been reached, a stage 806 drops the message and the logging method 800 terminates. Otherwise, the logging method 800 continues with a stage 808, which applies one or more filters (such as filters 305 and 307 discussed with reference to FIG. 3). If the message is filtered out (810), the message is dropped (806). Otherwise, a stage 812 sends the message to one or more destination logs (e.g., as determined by the formatter 308 of FIGS. 3 and 7), after which the logging method 800 is terminated.

In one embodiment of the invention, an application programming interface (API) provides unified configuration and/or viewing for both tracing and logging. An embodiment of the invention takes advantage of similarities between tracing and logging, and of synergistic effects of handling both— while not neglecting differences such as: path messages for traces; cross-referencing between traces and logs; or language-independent messages for logs.

It is envisioned that a unified approach to logging and tracing is configurable for different output formats and destinations, is highly controllable (e.g., uses controlled inheritance to reuse settings in hierarchies of code areas and message categories and/or allows relative control of message writing, for example enabling extended tracing for a classified subset of trace calls). Also, according to an embodiment of the invention, use of filters provides a finer granularity of log controller or log output, for example, when compared with only utilizing severity.

It should be appreciated that reference throughout this specification to "one embodiment" or "an embodiment" means that a particular feature, structure or characteristic described in connection with the embodiment is included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes groped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the invention are not to be limited to specific constructions and arrangements shown and described, since various other modifications may occur to those ordinarily skilled in the art upon studying this disclosure.

In the above description, numerous specific details may be set forth in order to provide a more thorough understanding of various embodiments of the invention. It will be appreciated, however, to one skilled in the art that the embodiments of the invention may be practiced without such specific details, based on the disclosure provided. Those of ordinary skill in the art, with the included descriptions, will be able to implement appropriate functionality without undue experimentation.

Various embodiments of the invention have been described above. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention.

The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem, network connection, a wireless link, and the like).

Figure 2:
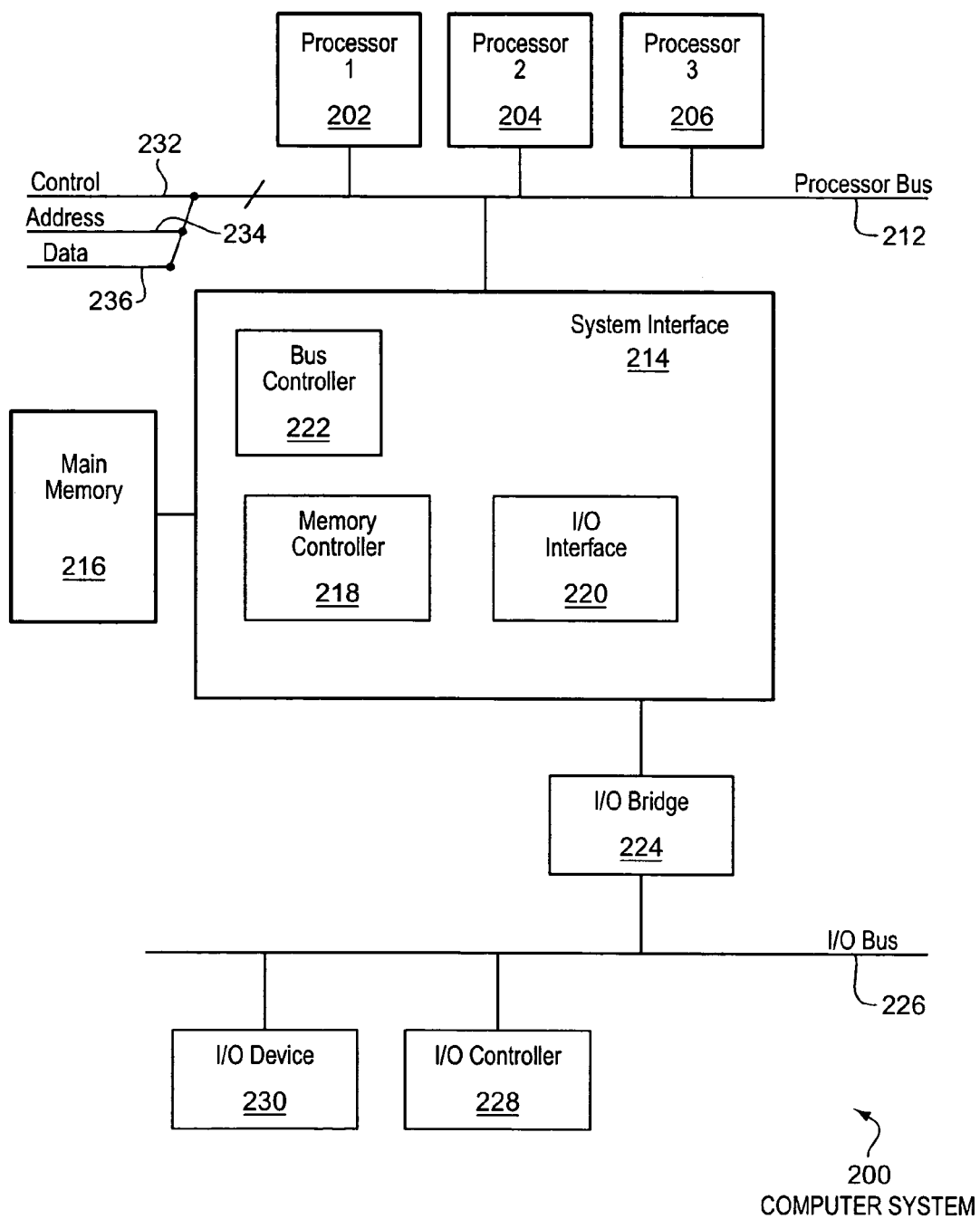
FIG. 2 is a block diagram illustrating an embodiment of a computer system.

FIG. 2 is a block diagram of a computer system. The computer system includes one or more processors 202-206. The processors 202-206 may include one or more multi-threaded processors having multiple threads or logical processors, and may be capable of processing multiple instruction sequences using their multiple threads, for example, concurrently. Processors 202-206 may include one more microprocessors, micro-controllers, field programmable gate arrays (FPGA), application specific integrated circuits (ASIC), central processing units (CPU), programmable logic devices (PLD), and similar devices that access instructions from system storage (e.g., main memory 216), decode, and execute those instructions by performing arithmetic and/or logical operations. Processors 202-206 may also include one or more internal caches (not shown) and a bus controller 222 to direct interaction with the processor bus 212. Processor bus 212 may be used to couple the processors 202-206 with the system interface 214. Processor bus 212 may include a control bus 232, an address bus 234, and a data bus 236.

System interface 214 (or chipset) may be connected to the processor bus 212 to interface other components of the system 200 with the processor bus 212. For example, system interface 214 may includes a memory controller 218 for interfacing a main memory 216 with the processor bus 212. The main memory 216 typically includes one or more memory cards and a control circuit (not shown). System interface 214 may also include an input/output (I/O) interface 220 to interface one or more I/O bridges or I/O devices with the processor bus 212. For example, as illustrated, the I/O interface 220 may interface an I/O bridge 224 with the processor bus 212. I/O bridge 224 may operate as a bus bridge to interface between the system interface 214 and an I/O bus 226. One or more I/O controllers and/or I/O devices may be connected with the I/O bus 226, such as I/O controller 228 and I/O device 230, as illustrated. I/O bus 226 may include a Peripheral Component Interconnect (PCI) bus or other type of I/O bus.

System 200 may include a dynamic storage device, referred to as main memory 216, or a random access memory (RAM) or other memory coupled to the processor bus 212 for storing information and instructions to be executed by the processors 202-206. Memory 216 also may be used for storing temporary variables or other intermediate information during execution of instructions by the processors 202-206. System 200 may include a read only memory (ROM) and/or other static storage device coupled to the processor bus 212 for storing static information and instructions for processor 210.

Memory 216 may include a wide variety of memory devices including rad-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 216 may store program modules, objects, images, data structures, program data, and other modules that perform particular tasks or implement particular abstract data types that facilitate system use.

I/O device 230 may include a display device (not shown), such as a cathode ray tube (CRT) or liquid crystal display (LCD), for displaying information to an end user. For example, graphical and/or textual indications may be presented to a user on the display device. I/O device 230 may also include an input device (not shown), such as an alphanumeric input device, including alphanumeric and other keys for communicating information and/or command selections to a processor. Another type of user input device includes cursor control, such as a mouse, a trackball, or cursor direction keys for communicating direction information and command selections to the processors 202-206 and for controlling cursor movement on the display device.

System 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hard coded logic, such as field programmable gate arrays (FPGAs), transistor-transistor logic (TTL) logic, or application specific integrated circuit (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

What is claimed is:

1. A method executing within a computer having a processor, comprising:
   receiving a message relating to unified logging and tracing, the message having a predefined severity, the message further including a tracing message and a logging message, wherein the tracing message is associated with a location representing a delimited code area including one or more of a code package, and a code class, wherein the logging message associated with a category representing a code problem area including one or more of a database problem, and a security audit problem;
   dropping the message if the predefined severity does not reach a threshold severity;
   applying one or more filters to perform a filter evaluation of the message if the predefined severity reaches the threshold severity, and publishing the message if it reaches the threshold severity and passes the filter evaluation, wherein the filter evaluation is to determine whether the message is to be restricted, screened out, or published with an altered behavior; and
   sending the message to a destination if the message fails the filter evaluation.

2. The method of claim 1, wherein each of the predefined severity and the threshold severity having a severity selected from a group comprising one or more of debug, path, info, warning, error, fatal, and none.

3. The method of claim 1, further including comparing the predefined severity with the threshold severity.

4. The method of claim 1, wherein the predefined severity and the threshold severity are inherited by a child message of the message, if a predefined severity of the child message reaches the threshold severity and child message passes the filter evaluation.

5. The method of claim 1, wherein the method is implemented utilizing Java.

6. The method of claim 1, wherein the message is sent by an application at a server.

7. A system comprising:
   a server comprising a processor and a storage medium coupled with the processor, the storage medium having instructions to execute a unified logging and tracing system, wherein the instructions are executed by the processor, the unified logging and tracing system having
   one or more log controllers to represent source data, each of the log controllers receiving a message having a predefined severity, the message further including a tracing message and a logging message, the tracing message is associated with a location, the location representing a delimited code area including one or more of a code package, and a code class, the logging message is associated with a category, the category representing a code problem area including one or more of a database problem, and a security audit problem, the one or more controllers to drop the message if the predefined severity does not reach a threshold severity;
   one or more filters coupled to the log controllers to perform a filter evaluation of the message if the predefined severity reaches the threshold severity, the one or more filters to publish the message if it reaches a threshold severity and passes the filter evaluation, wherein the filter evaluation is to determine whether the message is to be restricted, screened out, or published with an altered behavior, the one or more filters to send the message to a destination if the message fails the filter evaluation.

8. The system of claim 7, wherein the system is part of Java 2 Enterprise Edition (J2EE) engine.

9. The of claim 7, further including a formatter coupled to the log controllers to determine a format of the message prior to publication.

10. The system of claim 9, wherein the formatter includes one or more subclasses or modules selected from a group comprising a list formatter, a trace formatter, and an Extensible Markup Language (XML) formatter.

11. The system of claim 7, wherein each of the logs include one or more subclasses or modules selected from a group comprising a stream log, a file log, and a console log.

12. The system of claim 7, wherein the predefined severity and threshold severity includes a severity selected from a list comprising debug, path, info, warning, error, fatal, and none.

13. The system of claim 7, wherein the predefined severity and the threshold severity are inherited by a child message of the message, if a predefined severity of the child message reaches the threshold severity and child message passes the filter evaluation.

14. The system of claim 7, wherein the system is implemented using Java.

15. A machine-readable storage medium comprising instructions which, when executed, cause a machine to:
- receiving a message relating to unified logging and tracing, the message having a predefined severity, the message further including a tracing message and a logging message, wherein the tracing message is associated with a location, the location representing a delimited code area including one or more of a code package, and a code class, wherein the logging message associated with a category, the category representing a code problem area including one or more of a database problem, and a security audit problem;
- dropping the message if the predefined severity does not reach a threshold severity;
- applying one or more filters to perform a filter evaluation of the message if the predefined severity reaches the threshold severity, and publish the message if it reaches the threshold severity and passes the filter evaluation, wherein the filter evaluation is to determine whether the message is to be restricted, screened out, or published with an altered behavior; and
- sending the message to a destination if the message fails the filter evaluation.

16. The machine-readable storage medium of claim 15, wherein the predefined severity and the threshold severity include a severity selected from a group comprising debug, path, info, warning, error, fatal, and none.

17. The machine-readable storage medium of claim 15, wherein the instructions which, when executed, further cause the machine to compare the message severity with the threshold severity.

18. The machine-readable storage medium of claim 15, wherein the predefined severity and the threshold severity are inherited by a child message of the message, if a predefined severity of the child message reaches the threshold severity and child message passes the filter evaluation.

19. The machine-readable storage medium of claim 15, wherein the publication is via an inherited log.

20. The machine-readable storage medium of claim 15, wherein the message is sent by an application at a server.

\* \* \* \* \*